United States Patent [19]

Joseph et al.

[11] 3,807,054

[45] Apr. 30, 1974

[54] APPARATUS FOR ENHANCING THE APPEARANCE OF PLASTIC ARTICLES SUCH AS TELEPHONE CASES

[75] Inventors: Norman G. Joseph, Columbus; Herbert N. Blamer, Hilliard, both of Ohio

[73] Assignee: ARC Industries, Inc., Hilliard, Ohio

[22] Filed: Apr. 27, 1972

[21] Appl. No.: 248,288

[52] U.S. Cl............................ 34/73, 34/32, 34/37, 264/341
[51] Int. Cl........................................... F26b 21/06
[58] Field of Search........ 34/36, 37, 32, 73; 264/36, 264/341

[56] References Cited
UNITED STATES PATENTS
3,140,160  7/1964  Carlson.................................. 34/37
FOREIGN PATENTS OR APPLICATIONS
615,179  1/1949  Great Britain..................... 264/341
914,390  1/1963  Great Britain......................... 34/36

*Primary Examiner*—Carroll B. Dority, Jr.
*Assistant Examiner*—Larry I. Schwartz
*Attorney, Agent, or Firm*—Mahoney, Miller & Stebens

[57] ABSTRACT

A process for imparting to a new plastic article, initially, or for restoring to an old plastic article, a lustre or sheen to enhance its appearance. The process includes various cleansing and surface treating operations to prepare the articles for a final chemical treatment which consists in subjecting them to a vaporized solvent for the plastic of the article which will cause the plastic at the surface thereof to flow and fill in any scratches or voids thereby imparting to the articles a high lustre, gloss or sheen and to thereby greatly improve the physical character and the appearance of such surface.

2 Claims, 7 Drawing Figures

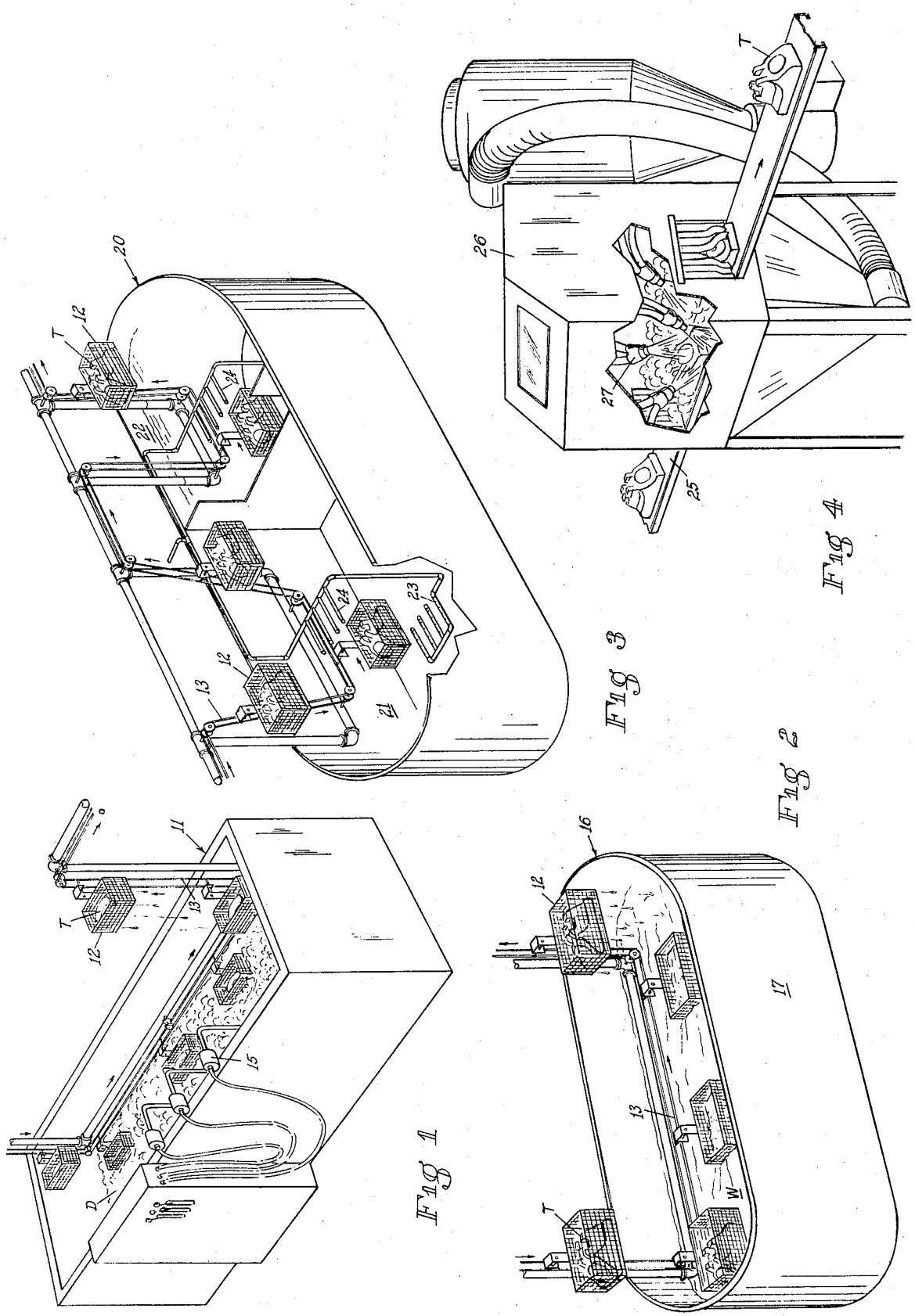

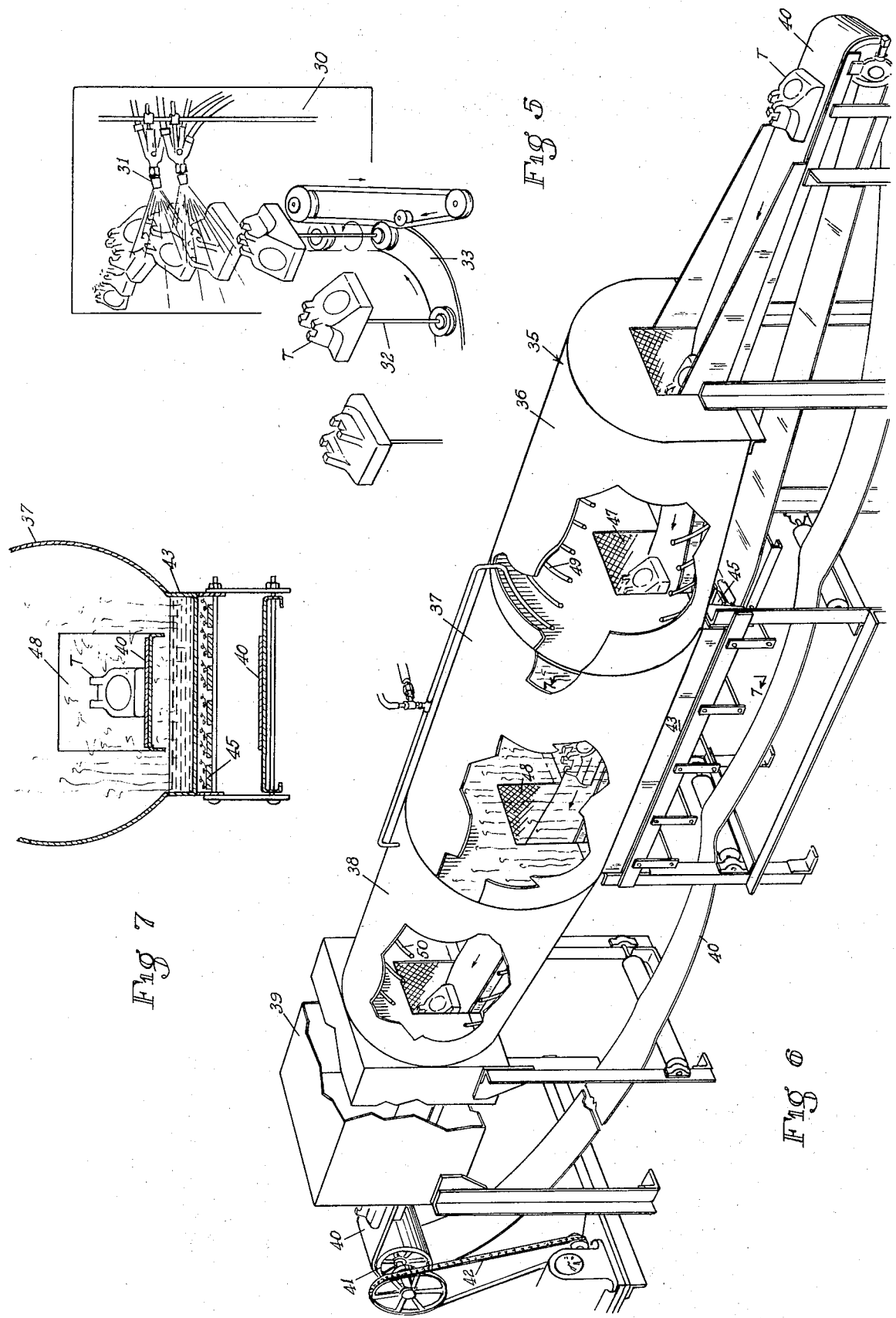

APPARATUS FOR ENHANCING THE APPEARANCE OF PLASTIC ARTICLES SUCH AS TELEPHONE CASES

The process of the present invention can be used in connection with the surface-treating of new plastic articles, as well as old ones, but will be described specifically hereinafter with reference to the refurbishing of old plastic articles such as telephone housings or other casing parts. It relates specifically to the treatment of thermoplastic articles.

It is well known that various plastic articles, such as telephone handsets, from day-to-day usage become caked with grease and grime, become scratched or dented, etc., so that they must be discarded or treated to restore their appearance sufficiently for further use. It has been customary in connection with telephone handsets to disassemble them, so as to remove all the mechanisms from the plastic housings and cases, and then treat the plastic housings and cases to some operation to attempt to restore the surface color and appearance thereof. These operations have usually included some form of a painting process, which does improve the surface appearance but the painted surface is not very durable because it will readily scratch and chip. Also, the painted surface really cannot compare in appearance and quality to the original plastic surface.

The present invention provides for the treating of a plastic article by various preliminary steps to clean and prepare the surface for an operation or operations to produce a lustre, gloss or sheen on its surface which will not be a separate coating, such as paint, but will be an inherent part of that surface.

The best mode contemplated in carrying out this invention is illustrated in the accompanying drawings in which:

FIG. 1 is a schematic perspective view illustrating a washing unit used in the initial stages of the process.

FIG. 2 is a schematic perspective view of a rinsing tank unit.

FIG. 3 is a schematic perspective view, partly cut away, of another washing unit used in the process and including liquid-circulating or agitating means.

FIG. 4 is a perspective view, partly cut away, of an abrasive type blasting unit used in the process.

FIG. 5 is a schematic perspective view showing a unit used in spraying the prepared articles with vaporized solvent for the plastic material of the prepared surface.

FIG. 6 is a schematic perspective view, partly cut away, of the unit which provides a mist of solvent through which the prepared plastic articles are passed.

FIG. 7 is a transverse sectional view taken along line 7—7 of FIG. 6.

According to this invention, the plastic articles to be treated are of the thermoplastic type and may have a base of various compositions as commonly produced. The operation or operations for producing the improved final surface consists in subjecting the prepared surface to a vapor or mist of a solvent for the plastic materal of the article.

The treatment for the purpose of enhancing the surface of the plastic articles includes various preliminary steps for the purpose of cleaning the surfaces of the articles to remove dirt, grime, grease or other extraneous foreign material therefrom preparatory to the chemical treatment of the surface with a solvent. This chemical treatment consists in subjecting the articles to a mist or vapor of a solvent for the plastic of the articles. Each article is subjected to the solvent vapor sufficiently to cause the substance of the vapor to penetrate the plastic surface and soften it so that the plastic material will flow at the surface, thereby filling the cracks, scratches and voids thereof to produce a smooth uniform surface. The resulting gloss, sheen or lustre provides an attractive surface, whether it is a new plastic article or a refurbished old article.

In the drawings and the following description, there are disclosed various means for subjecting the plastic articles to surface preparation treatments, such as washing, dry or wet blasting, etc., but it is to be understood that other devices can be used and the operations can be performed in varying sequences. Also, as previously indicated, the articles treated are illustrated as being old plastic telephone cases which are being refurbished, but the process of this invention is not limited to use on plastic articles of this specific type.

With reference to the drawings, in FIG. 1 there is illustrated a washing unit 11 suitable for performing the first washing operation on the articles which, for example are telephone cases T. However, this could be preceded by dry or wet blasting if desired, for example, with the unit of FIG. 4. These articles are placed in suitable wire baskets 12 which are carried at spaced intervals on a conveyor 13 which will move the baskets, with the articles submerged, through a bath of detergent D in an elongated tank. This tank is equipped with ultrasonic means, indicated generally at 15, for making the detergent more effective in the washing of the articles T.

The next operation may be a rinsing operation with clear water at the unit 16 to which the article-containing baskets 12 are conducted by the conveyor 13. This unit includes a tank 17 containing a water bath W of mild detergent or rinsing water, through which the baskets are moved, with the articles submerged.

The conveyor 13 may take the article-containing baskets on to still another rinsing unit 21. This unit is preferably divided into a first compartment 21 and a second compartment 22 through which the articles are successively moved, in submerged condition, in the rinsing water in the baskets as they are carried through the compartments 21 and 22 by the conveyor 13. Each of the compartments 21 and 22 is preferably equipped with agitating means to make the rinsing water more effective. This agitating means may consist of a series of air jets 23 at a lower level, directed upwardly, and a series of air jets 24 at a higher level, directed downwardly. These jets will cause a vertical circulation or whirling of the water in each compartment 21 and 22. Thus, the jets are located above and below the horizontal path of travel of the articles through the bath. The upper jets 24 are so located and directed that they will tend to prevent lifting of the articles out of the baskets.

After being subjected to the rinsing unit 20, the articles T may be removed from the baskets 12 and be placed in a belt conveyor 25 which will conduct the articles through a blasting unit 26 of the abrasive type, either wet or dry. This unit includes the blasting nozzles 27 which will be properly located to subject all the desired surfaces of the articles to the blasting effect. The blasted articles may then be returned to any or all of the washing and rinsing units previously described to remove all loose particles and dust.

The articles with their surfaces prepared as described above or by variations of the washing and blasting operations and sequence, are then subjected to the chemical treatment by one or more operations with a vaporized solvent for the plastic of the articles. These operations are indicated in FIG. 5 and 6. If the plastic surface is difficult to soften to cause it to flow and improve the surface, both operations may be used but in some cases only the operation indicated in FIG. 6 might be sufficient.

The blasted and washed articles may be subjected to the chemical treatment operation by the unit indicated in FIG. 5. This operation is accomplished by a spray unit 30 which is provided with nozzles 31 for spraying a vaporized solvent on the articles T. At this time, the articles are preferably supported on driven upstanding spindles 32 which are carried by a conveyor 33. This solvent will soften the surface of the plastic and may include dissolved color material, such as the same plastic material as the articles being treated. A suitable period of treatment is selected to produce a controlled surface of desired softness.

The next and final operation is to subject the prepared articles to a mist of a solvent for the plastic of the articles for a desired period while passing through a chamber. This operation is performed in a tunnel unit 35 indicated in FIG. 6 and 7. This tunnel unit may be divided into a condensate-collecting entrance tunnel section 36, a mist generating and treating main section 37, a condensate-collecting outlet tunnel section 38 and a final elongated outlet section 39. All of these sections communicate and the articles are carried successively therethrough on the upper run of a wire mesh belt 40 which is driven by an interfitting drum 41. The drum 41 is positively rotated by a suitable sprocket and chain drive 42.

The section 37 has its lower portion formed as a flat tray or tank 43 in which the solvent liquid is contained. Heaters 45 are provided below the tray and extending longitudinally thereof. These heaters serve to heat the liquid solvent to a suitable temperature to vaporize it so as to create a mist which rises in the tunnel section 37 and envelopes the articles T as they are conducted therethrough by the belt 40. A small inlet 47 and a small outlet 48 are provided for the article-carrying belt 40 to enter and leave the section 37 so as to minimize escape of the vapors from the section. Some vapors will escape through the inlet 47 to the section 36 but will be condensed on a cooling coil 49 which extends around the interior of the annular section 36. The condensed droplets will fall from the coil onto the bottom of the section 36 which is declined toward the tray 43 so that it will collect therein. Similarly, any mist escaping through the outlet 48 will be collected on a condensing coil 50 in the annular tunnel section 38, and will drop onto the declined bottom thereof so as to drain back into the tray 43. Further condensate-collecting tunnel-sections may be provided at either end. As the treated articles pass through the elongated outlet section 39, a sufficient time will elapse to permit complete setting and hardening of the treated and softened plastic surface.

The vaporized solvent used in the spray unit 30 and tunnel unit 35 will be determined by the nature of the plastic articles being treated. For treating telephone cases T formed of polyethylene, a liquid solvent consisting of a mixture of methylene-chloride and cellulose acetate has been used effectively. This liquid solvent is run into the tray 43 to a level of about 1 inch. The heat developed by the heaters 45 will then vaporize the liquid solvent and the vapors will envelope the articles passing through the tunnel section 37, as indicated.

If further color is needed in treating the surface of the article, a plastic material of the same nature as the article being treated and usually of the same color, can be dissolved in the liquid solvent. Ordinarily the operation indicated in FIG. 5 is used but in some cases if the surfaces of the articles are not too bad, the operation indicated in FIG. 6 can be used without that of FIG. 5.

As indicated various thermoplastic articles may be treated and the solvent used will depend on the nature of the thermoplastic material. However, as indicated, a suitable solvent used has consisted of methylene-chloride and cellulose acetate. This solvent mixture can be used both in the operation indicated in FIG. 5 and that indicated in FIG. 6. Freon or other vaporizing medium may be used in the mixture to aid in forming the mist or vapor. If no color is used, a mixture of 80 parts methylene-chloride, 12 parts freon, and 8 parts cellulose acetate has been found suitable. If color is added, for example, black, a mixture of 84 parts methylene-chloride, 12 parts freon and 4 parts cellulose acetate has been found suitable. If sufficient heat is used to vaporize the solvent, then the freon may be omitted. The methylene-chloride is the major ingredient and it is preferred to use it in the ratio of 20 parts of it to 1 part of cellulose acetate.

As previously indicated the washing and preparing operations may be varied. For example, in the ultrasonic washing unit 11 of FIG. 11, a hot freon-containing detergent may be used. Also, the tank may be divided into two sections (not shown) with the first section containing the ultrasonic units and the second section being free of such units. The freon will result in quick drying of the articles when removed from the liquid bath and exposed to the atmosphere.

A plastic article treated as above will have its surface enhanced by a higher gloss. Sheer or lustre which results from the vapors of solvent contacting the surface and softening it to cause it to flow into the various cracks, ports and depressions. This will smooth out the surface whether the article is new or old. Thus, the appearance of the article will be greatly enhanced.

Having thus described the invention what is claimed is:

1. Apparatus for treating plastic articles to enhance the surface thereof comprising a treating chamber in which a liquid solvent for the plastic is provided, means for conducting the plastic articles through the chamber and means for vaporizing the solvent to cause the vapors thereof to envelope the articles as they are conducted through the chamber, said liquid solvent being a body disposed at the lower side of the chamber and the articles being conducted thereover as the solvent is vaporized so that the vapors rise and envelope the articles, said apparatus being in the form of a tunnel comprising an intermediate section in which said chamber is provided having a tray at its lower side in which said solvent is disposed, an inlet section and an outlet section which are in communication with said intermediate section and aligned therewith, said article conducting means comprising a conveyor extending through all of said tunnel sections, said conveyor passing over said tray, said vaporizing means comprising means for heating the tray, cooler conduits disposed in the inlet and outlet section of the tunnel around the conveyor for condensing any vapors which enter thereinto from the treating chamber to return them to the solvent tray, each of said inlet and outlet sections having a lower side declining towards the intermediate section to direct the condensed liquid into the tray of said intermediate section.

2. Apparatus according to claim 1, including an additional outlet tunnel section connected to the first outlet tunnel section through which the article conveyor passes and wherein the treated articles will set and harden.

* * * * *